(12) United States Patent
Sirosh et al.

(10) Patent No.: US 9,909,535 B2
(45) Date of Patent: Mar. 6, 2018

(54) NON-SLIP FUEL TANK BRACKET

(71) Applicant: Quantum Fuel Systems LLC, Lake Forest, CA (US)

(72) Inventors: Neel Sirosh, Irvine, CA (US); Derrin Lynn Olischefski, Trabuco Canyon, CA (US)

(73) Assignee: QUANTUM FUEL SYSTEMS LLC, Lake Forest, CA (US)

( * ) Notice: Subject to any disclaimer, the term of this patent is extended or adjusted under 35 U.S.C. 154(b) by 236 days.

(21) Appl. No.: 14/046,601

(22) Filed: Oct. 4, 2013

(65) Prior Publication Data
US 2015/0096977 A1    Apr. 9, 2015

(51) Int. Cl.
| | | |
|---|---|---|
| *B65D 6/00* | (2006.01) | |
| *F02M 21/02* | (2006.01) | |
| *F16B 2/08* | (2006.01) | |
| *B60K 15/07* | (2006.01) | |
| *B60K 15/063* | (2006.01) | |

(52) U.S. Cl.
CPC ......... *F02M 21/0221* (2013.01); *B60K 15/07* (2013.01); *F02M 21/029* (2013.01); *F02M 21/0296* (2013.01); *F16B 2/08* (2013.01); *B60K 2015/0638* (2013.01); *Y02T 10/32* (2013.01)

(58) Field of Classification Search
CPC . B60K 15/067; B60K 15/07; B60K 15/03006
USPC ....... 220/4.14, 4.24, 562, 684, 686; 248/505
See application file for complete search history.

(56) References Cited

U.S. PATENT DOCUMENTS

| | | | | |
|---|---|---|---|---|
| 2,410,182 A | * | 10/1946 | Prior | B60K 15/067 248/315 |
| 2,902,240 A | * | 9/1959 | La Belle | B60K 15/067 248/201 |
| 3,224,334 A | * | 12/1965 | Curtis | F42B 25/00 102/382 |
| 3,227,410 A | * | 1/1966 | McCuen | B60K 15/00 224/401 |
| 4,013,300 A | * | 3/1977 | Berger | B60K 15/00 180/68.5 |
| 4,338,045 A | * | 7/1982 | Cour | F16L 1/20 138/105 |
| 4,357,027 A | * | 11/1982 | Zeitlow | B62D 49/00 220/4.14 |
| 4,712,162 A | * | 12/1987 | Quiogue | F16B 2/08 224/250 |
| 5,022,679 A | * | 6/1991 | Pazik | B60K 15/07 220/480 |

(Continued)

*Primary Examiner* — Jeffrey Allen
(74) *Attorney, Agent, or Firm* — Baker & Hostetler LLP

(57) ABSTRACT

A fuel holding device is secured to a vehicle by means of straps and brackets, which sits on a system of gaskets to prevent longitudinal sliding and rotation. A gasket system for preventing longitudinal sliding is disposed circumferentially around the tank body, and between the tank body and a circumferential bracket system that includes a U-shaped strap and an L-shaped bracket. The gasket system comprises a wedge-shaped base and a slider portion, with the U-shaped strap secured around the slider portion. A system for preventing rotation of a fuel-holding device has a circumferential wedge gasket segment, or a corrugated segment, positioned at a gap between the U-shaped strap and the L-shaped bracket.

12 Claims, 8 Drawing Sheets

(56) References Cited

U.S. PATENT DOCUMENTS

| | | | | |
|---|---|---|---|---|
| 5,308,101 A * | 5/1994 | Monty | ............... | B60D 1/182 267/74 |
| 5,329,673 A * | 7/1994 | Mason | ............... | F16L 33/04 24/19 |
| 5,445,351 A * | 8/1995 | Foster | ............... | B60K 15/067 248/345.1 |
| 5,518,272 A * | 5/1996 | Fukagawa | ............... | B60K 15/07 180/69.5 |
| 5,810,309 A * | 9/1998 | Augustine | ............... | B60K 15/07 248/154 |
| 6,053,533 A * | 4/2000 | Osborn | ............... | B60K 15/067 280/830 |
| 6,059,252 A * | 5/2000 | Emmann | ............... | B60K 15/067 248/503 |
| 6,378,823 B1 * | 4/2002 | Edholm | ............... | B60K 15/067 180/68.5 |
| 6,557,814 B1 * | 5/2003 | Rutz | ............... | B60K 15/07 248/503 |
| 8,596,682 B2 * | 12/2013 | Johnson | ............... | B60K 15/067 180/69.4 |
| 8,636,162 B2 * | 1/2014 | Schoen | ............... | B60K 15/03 220/4.14 |
| 8,814,097 B2 * | 8/2014 | Schnitzer | ............... | B64D 1/04 244/137.4 |
| 8,919,597 B2 * | 12/2014 | Handa | ............... | B60K 15/03 220/562 |
| 2003/0001059 A1 * | 1/2003 | Kim | ............... | B60K 15/067 248/346.01 |
| 2008/0054128 A1 * | 3/2008 | Ivarsson | ............... | B60K 13/04 248/74.3 |
| 2009/0114784 A1 * | 5/2009 | Tam | ............... | B60K 15/067 248/205.1 |
| 2010/0301159 A1 * | 12/2010 | Schnitzer | ............... | B64D 1/04 244/54 |
| 2011/0138923 A1 * | 6/2011 | Oelerich | ............... | B60K 15/07 73/756 |
| 2014/0103628 A1 * | 4/2014 | De Biasi | ............... | B60K 15/067 280/834 |

* cited by examiner

NON-SLIP FUEL TANK BRACKET

BACKGROUND OF THE INVENTION

1. Field of the Invention

This invention relates to storage tanks used for storing compressed gaseous fuels. In particular, the present invention is related to a mechanism for preventing the relative movement of tanks that are attached to vehicles using hoop brackets to safeguard against high pressure line breakages.

2. Description of the Prior Art

Cylindrical fuel tanks, such as compressed natural gas and compressed hydrogen gas tanks, are typically secured to the vehicle structure using hoop brackets. The high pressure tanks expand and contract during refueling and engine fuel consumption cycles, and are subject to 'g' forces induced by vehicle acceleration, deceleration, extended vibrations and collisions. Tanks that are mounted longitudinally (i.e., parallel to the vehicle axis) are especially prone to movement within the brackets either axially or rotationally, under repeated 'g' loads and expansion-contraction cycles.

For example, cylindrical fuel tanks which are mounted longitudinally on the roofs of buses or on the side of trucks may be prone to longitudinal sliding or hoop spinning within the brackets, causing breakage of high pressure gas lines affixed to the tanks. Any relative movement between a tank and brackets needs to be minimized to eliminate the risk of gas line breakage. This is a challenge especially for heavy tanks since the 'g' force is a product of the tank mass and the vehicle acceleration.

Typical bracket configuration includes an L-shaped bracket that is permanently bolted on the vehicle and a U-shaped strap that is attached to the L-shaped bracket and secures the tank in place (hereinafter "U-L joint"). A non-metallic gasket is typically placed between the tank and the brackets to prevent chafing damage of the tank shell and to allow some room for expansion. However, these conventional gaskets do not prevent lateral movement or rotation of the tank. In many cases, springs are deployed at the U-L joints to accommodate expansion-contraction cycles of the tank without damage to the bracket straps. However, the tanks can still move laterally.

The tank is prevented from moving longitudinally by frictional resistance between the non-metallic gasket and the tank. The frictional resistance depends on the coefficient of friction between the rubber gasket and the composite shell, and is proportional to the pressure applied by the bracket on the tank surface. Unfortunately, the pressure applied by the bracket on the tank decays with time, due to relaxation of the bracket material and loosening of the U-L joint under tank expansion-contraction cycles and repeated 'g' forces. As a result of the reduced frictional resistance between the brackets and the tank, the tank may slide longitudinally and or rotate, creating the safety hazard of gas line breakage.

Therefore, a cost-effective method is required for preventing the relative movement of tanks that are attached to vehicles using hoop brackets to safeguard against high pressure line breakages.

SUMMARY OF THE DISCLOSURE

To accomplish the objectives set forth above, the present invention provides a system for preventing longitudinal sliding of a fuel-holding device. The fuel-holding device includes a tank body, and a circumferential bracket system having a removable U-shaped strap and an L-shaped bracket that at are secured at a joint. A gasket system is disposed circumferentially around the tank body, and between the tank body and the circumferential bracket system. The gasket system comprises a wedge-shaped base and a slider portion, with the U-shaped strap secured around the slider portion.

The present invention also provides a system for preventing rotation of a fuel-holding device. The system includes a U-shaped strap and an L-shaped bracket disposed around the circumference of the fuel holding device, and a circumferential wedge gasket segment positioned at a gap between the strap and the bracket. In accordance with another embodiment, instead of the circumferential wedge gasket segment, a corrugated segment can be secured to the fuel-holding device and positioned at a gap between the strap and the bracket.

Some aspects of exemplary implementations of the disclosure provide wedge-shaped gaskets and intermediate sliders that are placed on the tank body and in between the U-shaped straps and L-shaped brackets and the tank body. If the tank body were to slide longitudinally, the wedge-shape imposes additional pressure on the tank body, exponentially increasing the frictional resistance between the tank body and the strap/bracket, thereby arresting the movement.

Additionally, a circumferential wedge-shaped gasket is bonded to the tank body at the gap between the U-shaped strap and L-shaped bracket. The wedge-shaped gasket can also be secured in place using epoxy or polyurethane impregnated fiber glass cloth. This wedge-shaped gasket prevents rotation of the tank body, since frictional resistance against rotation increases with rotational displacement as the wedge creates added pressure on the tank body's external shell.

Some aspects of exemplary implementations of the disclosure provide wedge-shaped gaskets configured to interact with the tank body and U-shaped straps and L-shaped brackets that help prevent relative movement of the tank body. The body can be secured to a frame, and the frame can be a part of a vehicle, such as an automobile, truck, bus, locomotive or a marine vessel. The intermediate slider that is deployed between the wedge-shaped gasket and the U-shaped strap or L-shaped bracket has ridges on the surface that contacts the bracket segments, thereby securing the brackets.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides systems and devices for preventing longitudinal sliding and rotation of cylindrical fuel tanks while secured by the brackets attached to vehicular frames. Various aspects of the invention described herein may be applied to any of the particular applications set forth below or for any other types of securing systems. The present invention may be applied as a stand-alone system or method, or as part of a vehicle or other system that utilizes fuel.

Some aspects of the present invention provide wedge-shaped gaskets and sliders that are placed on cylindrical fuel tanks, vessels, or any other type of device capable of containing a gaseous or liquid fuel by one or more securing techniques. The gaskets may be formed from thermoplastic, thermosetting plastic, rubber or other elastomeric materials, which are described in greater detail elsewhere herein. Such gaskets can, to some degree, protect the bracket's strap from wearing down by rubbing against the tank or cylinder surface. Such gaskets may also function as dampers to vibrations that may occur on the vehicle and/or tank.

Figure 1:
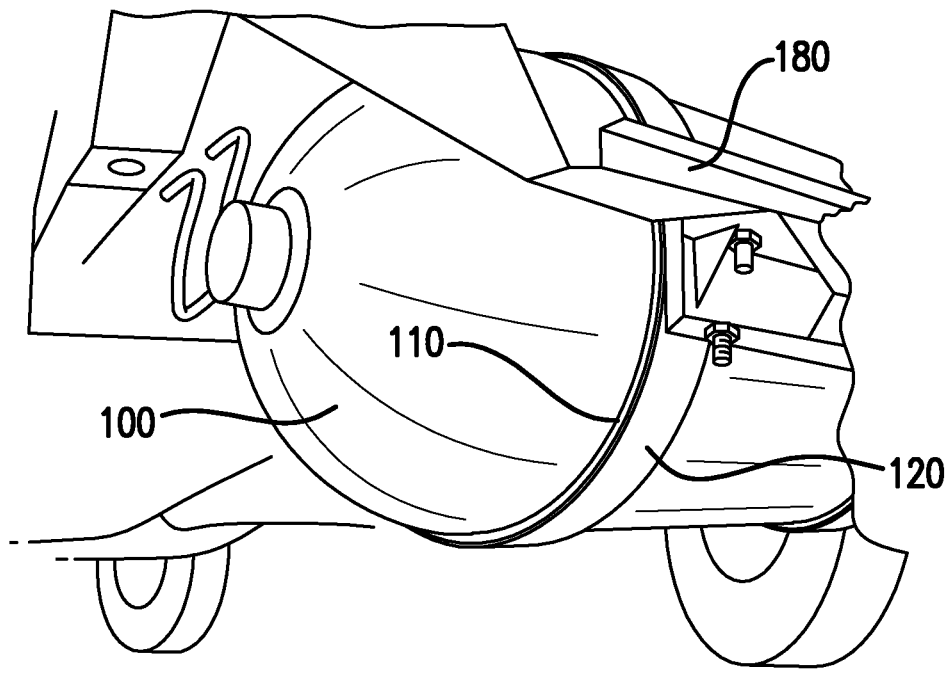
FIG. 1 illustrates a vehicle equipped with a cylindrical fuel tank secured to the vehicle structural frame according to the present invention.
Figure 2:
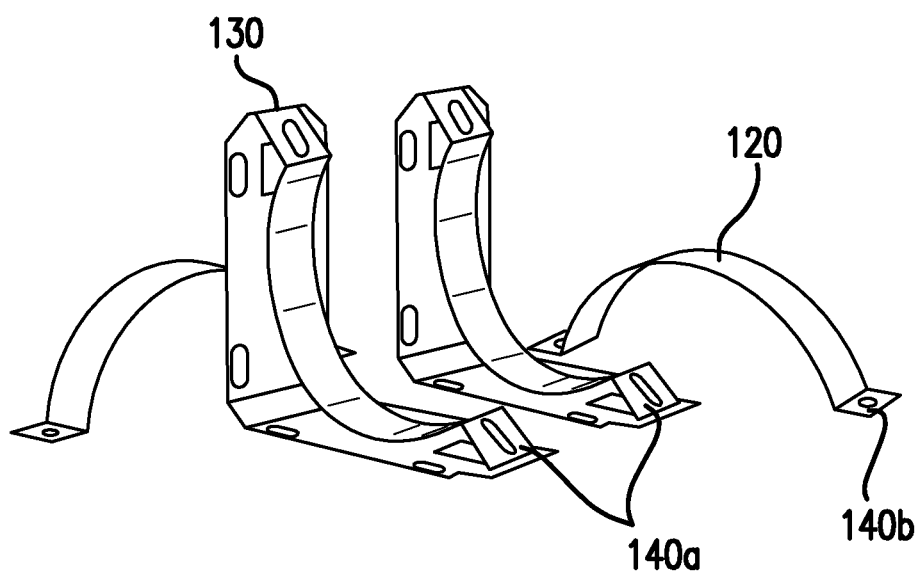
FIG. 2 illustrates an L-shaped bracket and a U-shaped strap which is used for attachment to a vehicle frame under the present invention.
Figure 3:
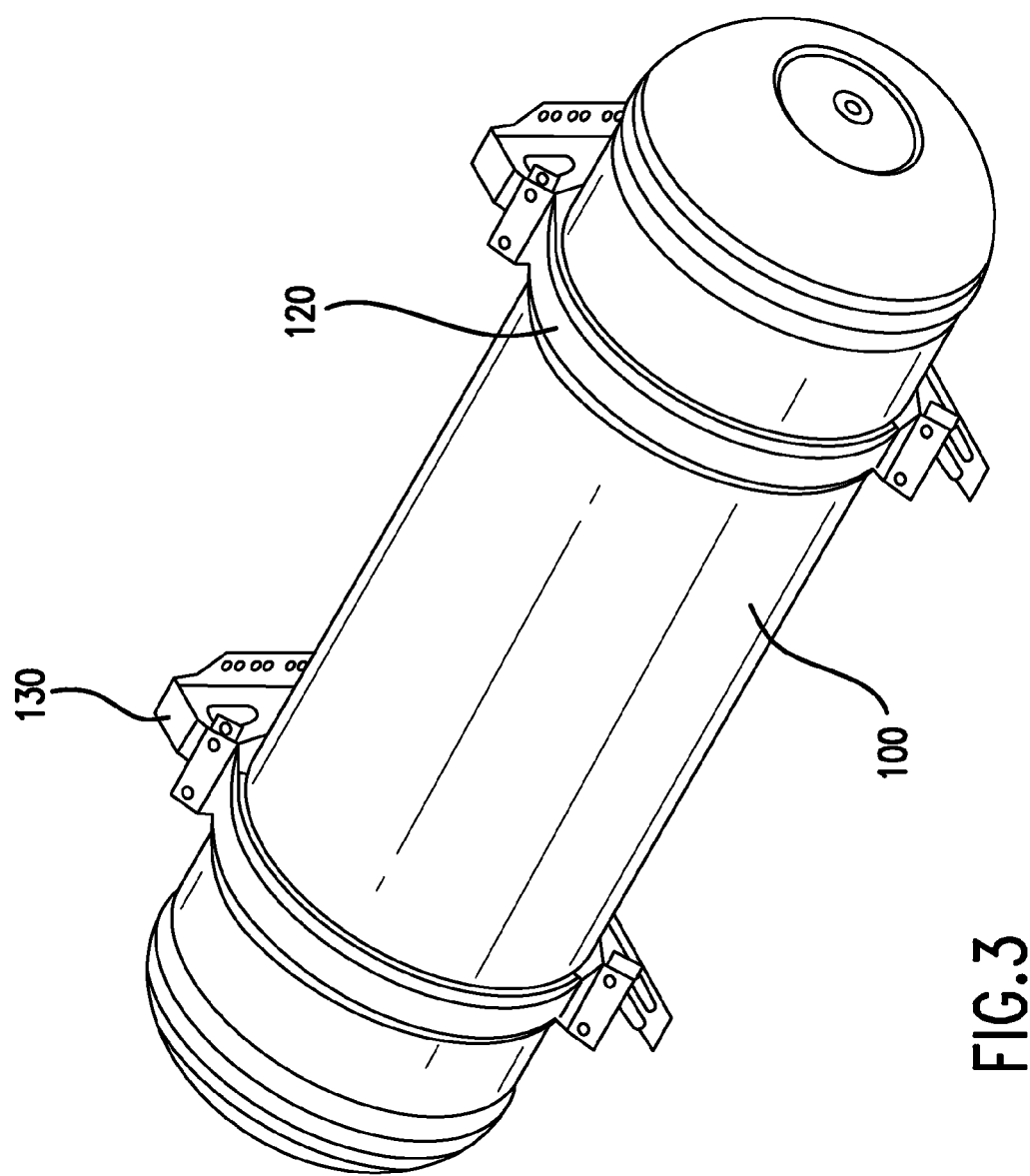
FIG. 3 is a perspective view illustrating a cylindrical fuel tank and a tank securement system according to the present invention.
Figure 4:
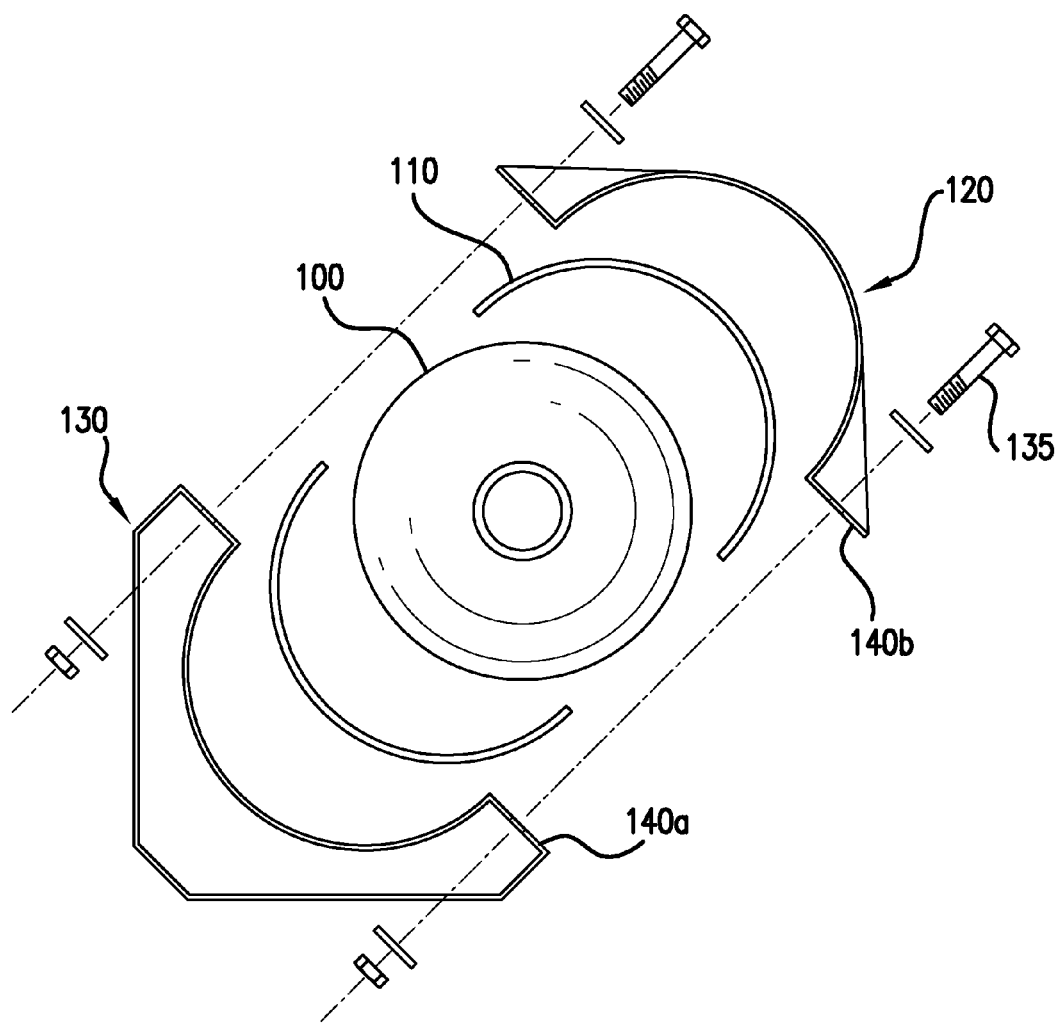
FIG. 4 is an exploded cross-sectional view illustrating the tank securement system of the present invention shown securing a cylindrical tank to a vehicle frame according to the present invention to prevent longitudinal displacement thereof.

FIGS. 1 and 2 illustrate a vehicle equipped with a cylindrical gaseous fuel tank 100 secured to the vehicle structural frame 180 by means of a U-shaped strap 120 and an L-shaped bracket 130, and provided with a gasket 110 in between the tank 100 and the strap 120 and bracket 130. Referring to FIGS. 1-4, the gasket 110 is disposed around the circumference of the tank 100, and between the shell of the tank 100 and the strap 120 and bracket 130.

The frame 180 may be a part of a vehicle, and a vehicle may be any type of vehicle known in the art. A vehicle may be a truck, such as a light duty truck (e.g., class 1, class 2 or class 3), medium duty truck (e.g., class 4, class 5 or class 6), or heavy duty truck (e.g., class 7 or class 8). Vehicles include but are not limited to cars, wagons, vans, buses, high-occupancy vehicles, dump trucks, tractor trailer trucks, or any other vehicles such as marine vessels. The vehicle may have any weight depending on its type.

The tank 100 may be any fuel container, which may have various shapes, dimensions, proportions, or configurations. A cylindrical fuel tank is provided by way of illustration, but is not intended to be limiting.

The tank 100 may be capable of containing a fuel with a certain amount of pressure. For example, the tank 100 may be capable of containing a fuel having a range between about 100 psi and about 10000 psi, or having less than or equal to about 10000 psi, 8000 psi, 7000 psi, 6500 psi, 6000 psi, 5500 psi, 5000 psi, 4750 psi, 4500 psi, 4250 psi, 4000 psi, 3750 psi, 3500 psi, 3250 psi, 3000 psi, 2750 psi, 2500 psi, 2000 psi, 1500 psi, 1000 psi, 500 psi, 300 psi, 100 psi, or less.

The tank 100 can be used to store liquid fuel, such as liquid petroleum gas, liquefied natural gas, or liquefied hydrogen gas. Alternatively, the tank 100 may be capable of containing a gaseous fuel, such as natural gas, therein. Any reference to gaseous fuel or fuel may include natural gas. This may include liquefied natural gas (LNG) or compressed natural gas (CNG). A gaseous fuel may include hydrogen or hydrogen based gas, hythane, H2CNG, or any other gas.

The tank 100 may have one or more fuel outputs. The fuel output may transfer the fuel to another part of the vehicle, such as an engine or fuel cell propulsion system. In one example, the fuel may be output to mix with air in the cylinder of an engine. The fuel may be used in the process of propelling the vehicle.

The tank 100 can be made from steel, aluminum, steel wires, glass fiber, carbon fiber, polymer, carbon fiber reinforced polymer, or a composite material such as carbon fiber reinforced polymer, or other suitable material or a combination of materials. The tank 100 can be mounted on a vehicle in any number of ways, such as side-mounted, rear-mounted, behind-the-cab mounted, or roof-mounted. One, two or more tanks may be mounted on a single side of the vehicle, or on each side of the vehicle. The side-mounted tanks may at least partially protrude from a side surface of the vehicle. FIG. 1 illustrates a rear-mounted device configured to hold fuel attached to a vehicle.

Gasket System to Prevent Longitudinal Sliding of Fuel Tanks

FIG. 2 illustrates the L-shaped bracket 130 which is usually attached to a vehicle frame, and the U-shaped strap 120. Interfaces 140a and 140b are provided on the bracket 130 and strap 120, respectively, to allow the strap 120 and bracket 130 to be removably coupled to each other via a bolt 135.

The strap 120 can be made of various materials, including steel, carbon fiber, fiberglass (hereinafter also "glass fiber"), or a composite material such as a material containing a first component and a second component, such as a ceramic, metal, glass fiber, aramid fiber, carbon fiber, and or/polymer or another suitable material or combination thereof.

Figure 8A:
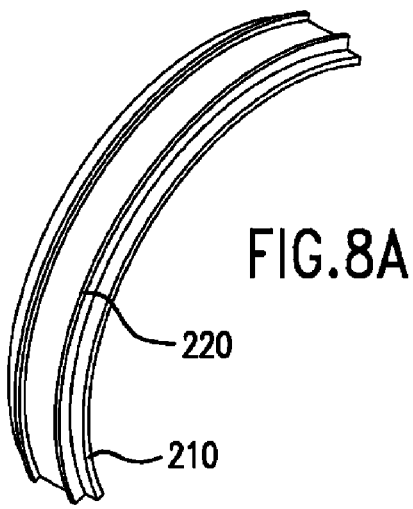
FIG. 8A is an enlarged perspective view of a wedge-shaped underlay.
Figure 8B:
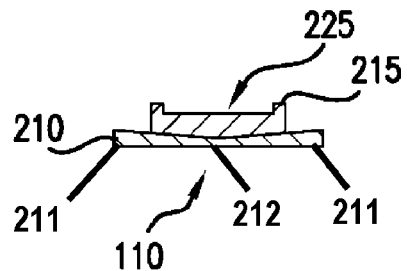
FIG. 8B is an enlarged cross-sectional view of a wedge-shaped underlay and a slider.
Figure 9:
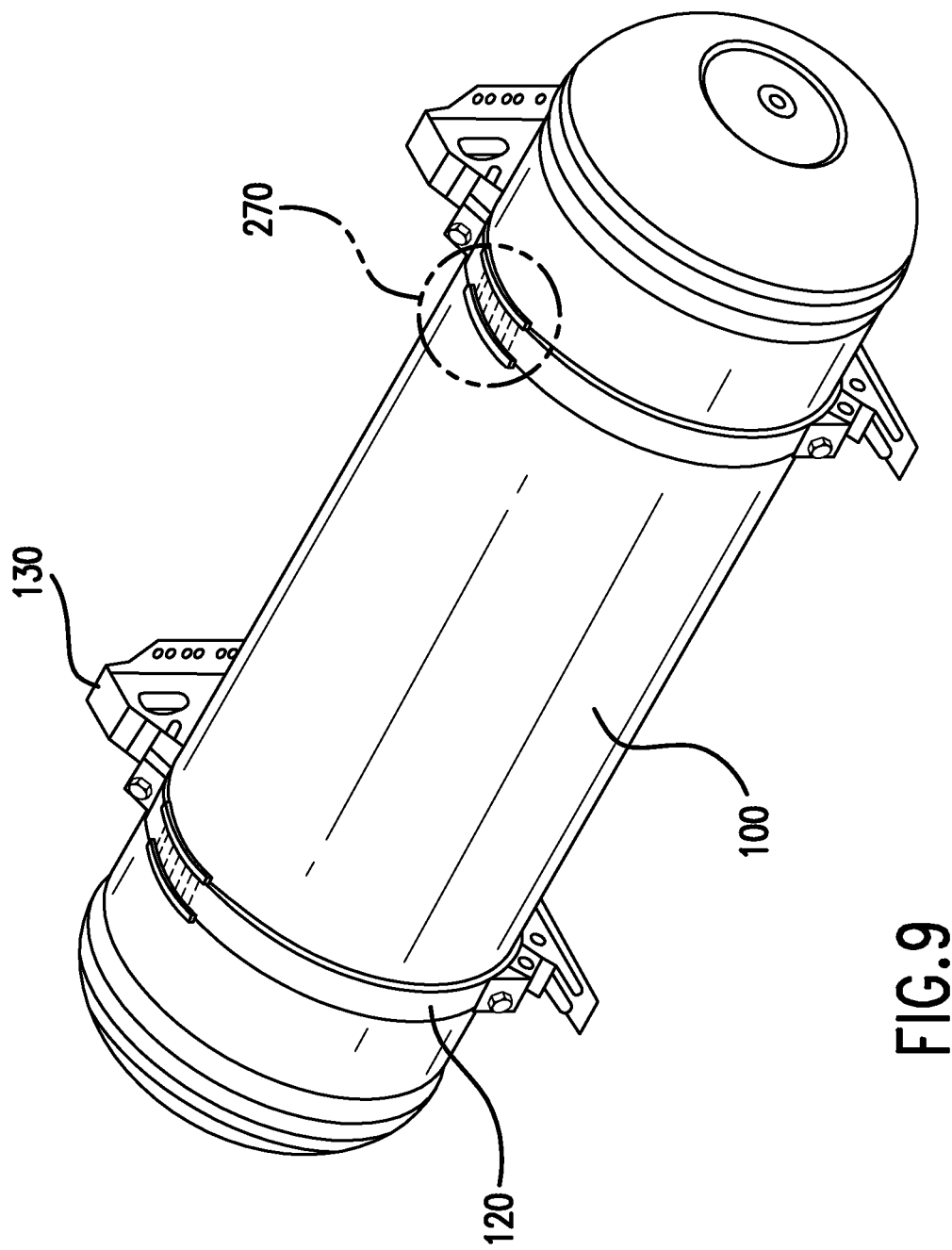
FIG. 9 is a perspective view illustrating a cylindrical fuel tank and a tank securement system according to another embodiment of the present invention.
Figure 10A:
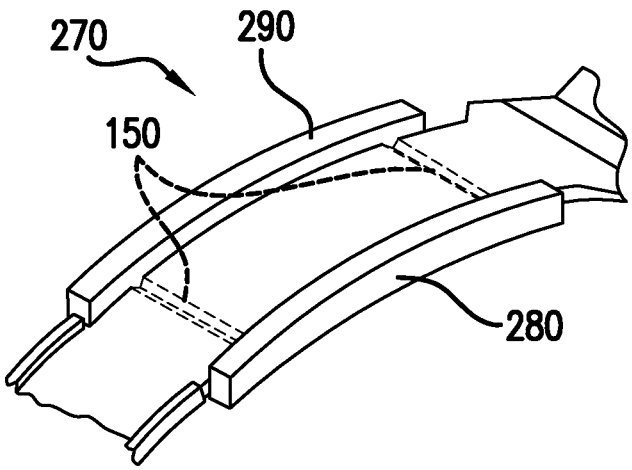
FIG. 10A is an enlarged perspective view of the area designated 270 from FIG. 9.
Figure 10B:
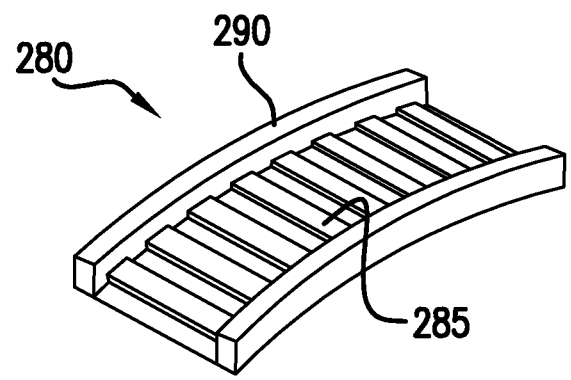
FIG. 10B is a perspective view of the corrugated segment in the area 270 in FIG. 10A.
Figure 10C:
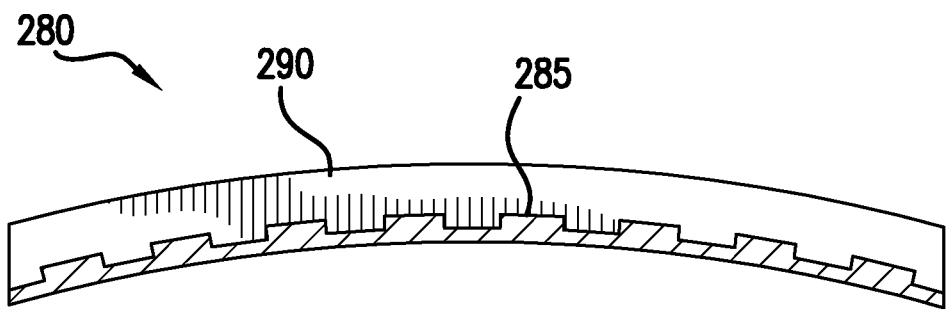
FIG. 10C is a cross-sectional view of the area 270 of FIG. 10A.
Figure 11:
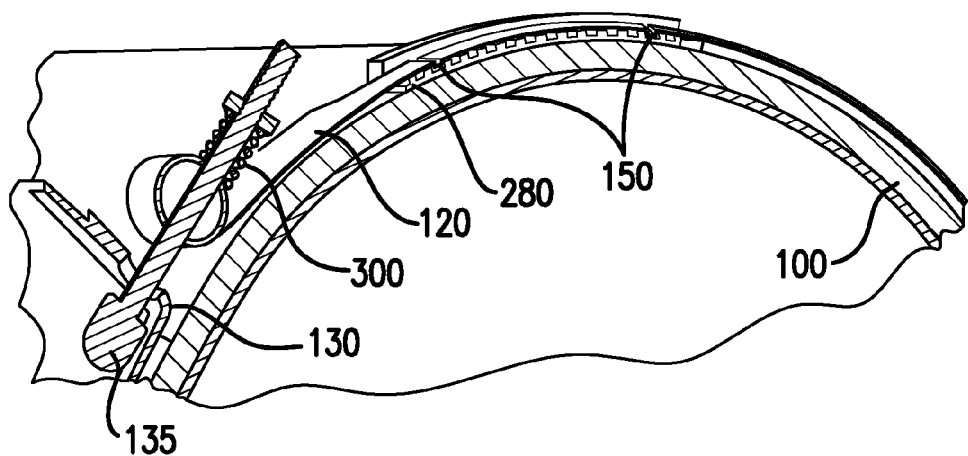
FIG. 11 is a side plan view illustrating the securement system of FIG. 9.
Figure 12:
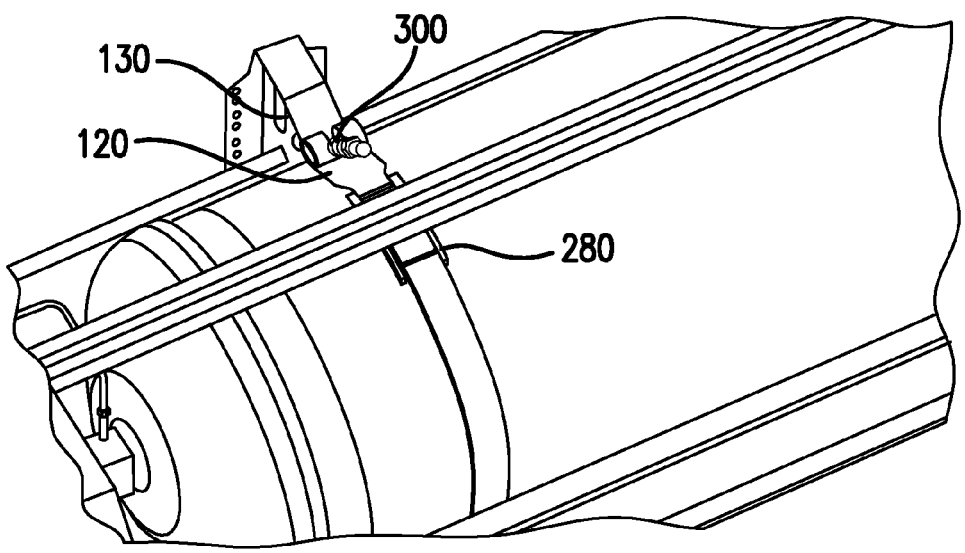
FIG. 12 is an enlarged perspective view of the tank system of FIG. 9.

Referring also to FIGS. 8A and 8B, the gasket 110 includes a wedge-shaped base 210 and a slider 220 positioned on top of the base 210. The cross-section of wedge-shaped base 210, seen in FIG. 8B, has two portions of increased thickness 211 disposed on either side of a portion of decreased thickness 212 in the central part of the cross-section. The slider 220 has an upper groove 225 which is adapted to receive and guide the strap 120. The groove 225 is formed by ridges 215 that prevent the strap 120 from sliding axially relative to the slider 220. The gasket 110 may circumferentially encompass part of the tank 100, underneath the strap 120.

The components of the gasket system, such as the base 210 and the slider 220, can be made from various materials, including rubber, plastic, thermoplastic materials, thermosetting materials, and self-healing polymers or composites, glass fiber, carbon fiber, plastic, a composite material such as carbon fiber reinforced polymer, or combinations thereof. These components of the gasket system, including features such as the central region and ridges, can prepared by methods such as extrusion, injection molding, vulcanization, rotational molding, thermoforming, and thermoplastic compression molding, and other known methods or combinations of known methods. Specific materials that can used to make the gasket system components and their various features include one or more of rubber, polyethylene, polypropylene, other polyalkenes, polyglycols, poly-acids (such as polylactic acids), poly-thiols, disulfide-crosslinked polyalkenes, polyethylene terphthalate, polyamide, polystyrene, epoxy, polyurethane or another suitable material.

In some cases, materials from which the components of the gasket system are formed have a relatively high coefficient of friction with the surface of the device configured to hold fuel, which can be formed of aluminum, steel, glass fiber, carbon fiber, polymer, carbon fiber reinforced polymer, or other materials described above. In some cases, the coefficient of friction $\mu$ is in the range of about 0.05 to about 1.0, or at least about 0.05, or 0.1, or 0.15, or 0.2, or 0.25, or 0.3, or 0.35, or 0.4, or 0.55, or 0.5, or 0.55, or 0.6, or 0.65, or 0.7, or 0.75, or 0.8, or 0.85, or 0.9, or 0.95, or 1.0.

In some cases, the wedge-shaped base 210 may be secured to the tank 100 by an adhesive. The adhesive can be glue, solvent based adhesive, polymer dispersion adhesive, contact adhesive, hot-melt adhesive, reactive adhesive (such as polyester resin, polyurethane resin, or acrylic polymer), or another adhesive. In some cases, the adhesive creates a chemical bond between the surface of the gasket and the surface of the tank 100.

The strap 120 and bracket 130 in combination with the gasket 110 function to prevent longitudinal displacement of the tank 100. The present invention also provides a tank securing wedge gasket 250 and adhesive connector 260 that functions to prevent rotation of the tank 100.

Gasket Systems to Prevent Tank Rotation

Referring also to FIGS. 3, 5, 6, 7A and 7B, the circumferential wedge gasket 250 may be provided on the shell of the tank 100, bonded to the tank 100 at the connector 260. The wedge gasket 250 extends below the strap 120 and bracket 130 at the interface 140a, 140b. As the tank 100 undergoes angular rotation, the wedge gasket 250 resists the rotation due to increased pressure from the interface 140a, 140b between the strap 120 and bracket 130. Specifically, during angular rotation, the wedge gasket 250 becomes squeezed between the tank 100 and the bolted joint at the interface 140a/140b, causing proportionally increasing pressure on the tank 100 and a corresponding increase in frictional resistance.

Figure 5:
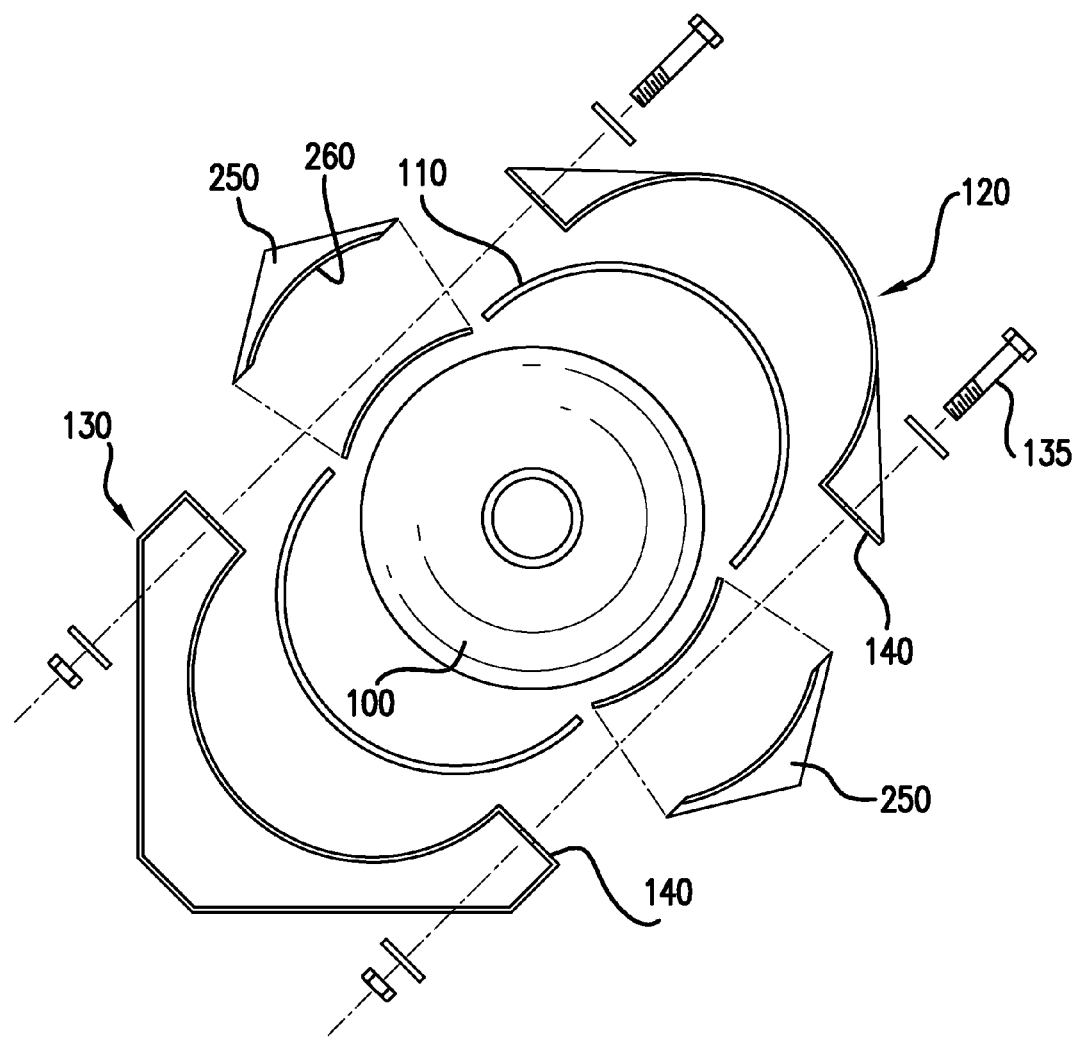
FIG. 5 is an exploded cross-sectional view illustrating the tank securement system of the present invention shown securing a cylindrical tank to a vehicle frame according to the present invention to prevent rotation of the tank.
Figure 6:
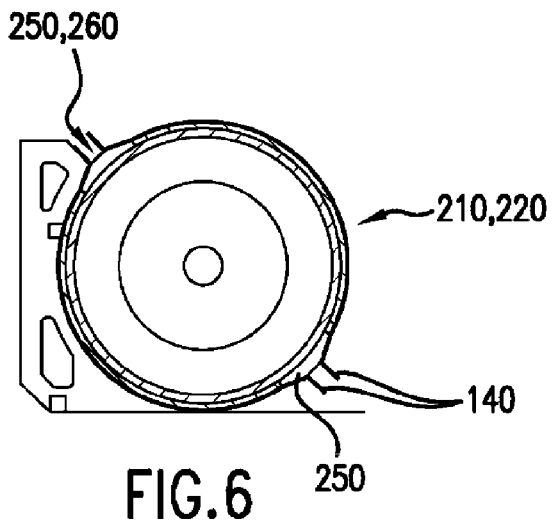
FIG. 6 is a cross-sectional side view illustrating the fuel tank and tank securement system of FIG. 3.
Figure 7A:
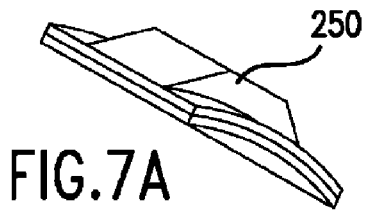
FIG. 7A is an enlarged perspective view of a tank securing wedge gasket.
Figure 7B:
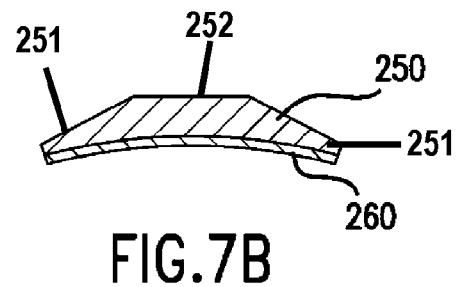
FIG. 7B is an enlarged cross-sectional view of a tank securing wedge gasket and adhesive interface.

The circumferential gasket wedge 250 can be hollow, and can be filled with the same material as the base 210 and the slider 220, or with another material. As best shown in FIGS. 7A and 7B, the wedge 250 can be shaped as either a truncated triangle with a curved base side, or as shown in FIG. 5, it can be shaped as a regular triangle with a curved base side. Both shapes will result in the application of pressure on the tank 100 and increased frictional resistance as the tank 100 undergoes rotation. The increase in frictional resistance is due at least in part to the cross-section of wedge 250, which has two portions of decreased thickness 251 disposed on either side of a portion of increased thickness 252 in the central part of the cross-section.

The circumferential gasket wedge 250 may have certain material properties. For example, the wedge 250 may have a compressive strength of at least about 5 MPa, or 15 MPa, or 15 MPa, or 25 MPa, or 35 MPa, 45 MPa, or 55 MPa, or 65 MPa, or 75 MPa, or 85 MPa, or 100 MPa, or 150 MPa, or 250 MPa, or greater, or a tensile strength of at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa, or greater. In addition, the circumferential gasket wedge 250 may have a tensile strength of 15 MPa and a modulus of 10 MPa. In some instances, the wedge shape of the gasket wedge 250 can be substituted with other shapes that may have similar effects as the wedge shape.

In some cases, grooves, bumps, indentation, or protrusions, or combinations thereof, may replace the circumferential gasket wedge segment 250 as an alternative.

FIGS. 9-12 illustrate an alternative tank securing mechanism 270 that incorporates a corrugated segment 280 that is adhesively bonded to the tank 100, and which prevents rotation of the tank 100 by interlocking with protrusions 150 that extend from the strap 120. Specifically, the corrugated segment 280 is shown in FIGS. 10A-10C, and includes corrugations 285 provided in a groove that is defined by two outer ridges or walls 290. The corrugated segment 280 is positioned underneath the strap 120. The strap 120 is adapted to be positioned inside the groove, and the strap 120 is provided with protrusions 150 that engage with or interlocks the corrugations 285 to provide resistance to rotational displacement of the tank 100. In addition, a bracket tensioner spring 300 is positioned at the bolt 135 that secures the strap 120 to the bracket 130. The tensioner spring 300 keeps the strap 120 in tension regardless of the state of pressure, and radial expansion of the shell of the tank 100.

The protrusions 150 can be fabricated by localized bending of the strap 120, or by welding on beads across the width of the strap 120. The corrugated segment 280 may have certain material properties, such as a compressive strength of at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa, or greater, or a tensile strength of at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa, or greater. For example, the corrugated segment 280 may have a tensile strength of 15 MPa and a modulus of 10 MPa.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:
1. A fuel-holding device comprising:
a cylindrical tank body;
a circumferential bracket system having a removable U-shaped strap and an L-shaped bracket that are secured at a joint; and
a gasket system disposed circumferentially around the tank body and between the tank body and the circumferential bracket system;
the gasket system comprising one or more gaskets consisting essentially of one or more thermoplastic, ther- mosetting plastic, rubber or other elastomeric materials, each gasket comprising:
  a wedge-shaped base having a cross-section comprising a substantially flat bottom surface and a tapered top surface, with a tapered profile of the tapered top surface formed from two side portions of increased thickness disposed on either side of a central portion of decreased thickness, with the wedge-shaped base having a central channel formed along its length by the tapered top surface of the cross-section, and
  a slider component positioned on top of the wedge-shaped base in the central channel between the side portions of increased thickness,
with the U-shaped strap secured around the slider component.

2. The device of claim 1, wherein the slider component has an upper groove which receives and guides the U-shaped strap.

3. The device of claim 1 wherein the slider component further comprises ridges that protrude radially outwardly and channeling the circumferential bracket system.

4. The device of claim 1, wherein the gasket system is secured to the tank body with the aid of an adhesive or fabric impregnated in epoxy or polyurethane or other resin.

5. The device of claim 1, wherein the U-shaped strap is maintained under tension during expansion and contraction of the tank body by a spring in compression, the spring disposed at the joint between the U-shaped strap and the L-shaped bracket.

6. The device of claim 1, wherein the tank body contains a gaseous fuel therein.

7. A system for preventing rotation of a cylindrical fuel-holding device, comprising:
  a U-shaped strap and an L-shaped bracket disposed around the circumference of the fuel holding device and secured at a joint; and
  a circumferential wedge gasket segment consisting essentially of one or more thermoplastic, thermosetting plastic, rubber or other elastomeric materials and positioned between the fuel-holding device and the strap and the bracket at the joint,
  wherein the gasket segment has a cross-section comprising two portions of decreased thickness disposed on either side of a portion of increased thickness in a central part of the cross-section;
  wherein the system for preventing rotation further comprises a gasket system disposed circumferentially around the fuel-holding device and between the fuel-holding device and the U-shaped strap,
  the gasket system comprising one or more gaskets consisting essentially of one or more thermoplastic, thermosetting plastic, rubber or other elastomeric materials,
  each gasket comprising:
    a wedge-shaped base having a cross-section comprising a substantially flat bottom surface and a tapered top surface, with a tapered profile of the tapered top surface formed from two side portions of increased thickness disposed on either side of a central portion of decreased thickness, with the wedge-shaped base having a central channel formed along its length by the tapered top surface of the cross-section, and
    a slider component positioned on top of the wedge-shaped base in the central channel between the side portions of increased thickness,
  with the U-shaped strap secured around the slider component.

8. The system of claim 7, wherein the gasket segment is shaped as a truncated triangle with a curved base side.

9. The system of claim 7, wherein the gasket segment is shaped as a regular triangle with a curved base side.

10. The system of claim 7, wherein the gasket segment is secured to the fuel-holding device with the aid of an adhesive or fabric impregnated in epoxy or polyurethane or other resin.

11. The system of claim 7, further including a fuel-holding device that contains a gaseous fuel therein.

12. The system of claim 11, wherein the U-shaped strap is maintained under tension during expansion and contraction of the fuel-holding device by a spring in compression, the spring disposed at the joint between the U-shaped strap and the L-shaped bracket.

* * * * *